United States Patent [19]

Nitta

[11] Patent Number: 4,811,868
[45] Date of Patent: Mar. 14, 1989

[54] VALVE FOR AEROSOL CONTAINER TO DISPENSE A GIVEN AMOUNT OF AEROSOL

[75] Inventor: Tomio Nitta, Yokohama, Japan

[73] Assignee: Tokai Corporation, Yokohama, Japan

[21] Appl. No.: 90,065

[22] Filed: Aug. 27, 1987

[30] Foreign Application Priority Data

Sep. 12, 1986 [JP] Japan .................. 61-139324[U]

[51] Int. Cl.⁴ .............................................. B65D 83/14
[52] U.S. Cl. ................................... 222/462.2; 251/333
[58] Field of Search .............. 222/402.2, 402.24, 402.1, 222/450; 251/332, 333, 357

[56] References Cited

U.S. PATENT DOCUMENTS

| | | | |
|---|---|---|---|
| 2,867,356 | 1/1959 | Thomas .................... | 222/402.2 X |
| 2,985,342 | 5/1961 | Focht ....................... | 222/402.24 |
| 3,055,560 | 9/1962 | Meshberg ................. | 222/402.2 |
| 3,073,489 | 1/1963 | Friedman ................. | 222/402.2 |
| 4,135,648 | 1/1979 | White ....................... | 222/402.2 |
| 4,427,137 | 1/1984 | Dubini ..................... | 222/402.2 |
| 4,577,784 | 3/1986 | Brunet ..................... | 222/402.2 |
| 4,597,512 | 7/1986 | Wilmot ..................... | 222/402.2 |

FOREIGN PATENT DOCUMENTS 1575061 3/1978 Fed. Rep. of Germany .................. 222/402.24

Primary Examiner—Michael S. Huppert
Attorney, Agent, or Firm—Armstrong, Nikaido, Marmelstein & Kubovcik

[57] ABSTRACT

A valve for aerosol container to dispense a given amount of aerosol from an associated aerosol tank, comprising a base solid providing a valve chamber and a valve stem slidably fitted and upwardly biased by a spring in the chamber. An inlet is made on the bottom of the chamber thereby permitting injection of aerosol from the associated aerosol tank. The valve stem provides a longitudinal channel and an outlet communicating the channel with the valve chamber, and a valve head fixed to the bottom end. A valve ring fitted at the upper side of the chamber in air-tight fashion shutting the outlet all the time. Whereby on depression of the valve stem, the valve ring is yieldingly bent for opening the outlet of the valve stem, thereby allowing a predetermined amount of aerosol to flow out of the valve chamber and eject from the longitudinal channel of the valve stem while shutting the inlet on the bottom of the chamber with the valve head of the valve stem.

1 Claim, 1 Drawing Sheet

U.S. Patent   Mar. 14, 1989   4,811,868
FIG. 1
FIG. 2
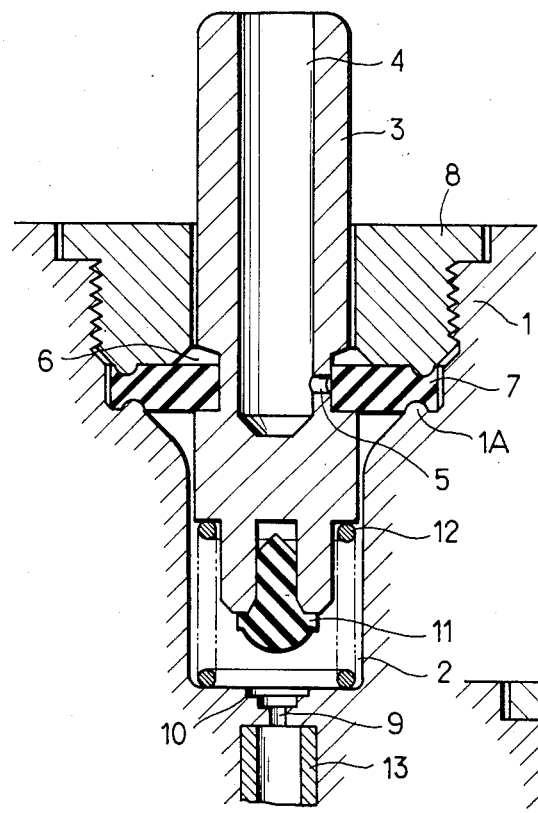
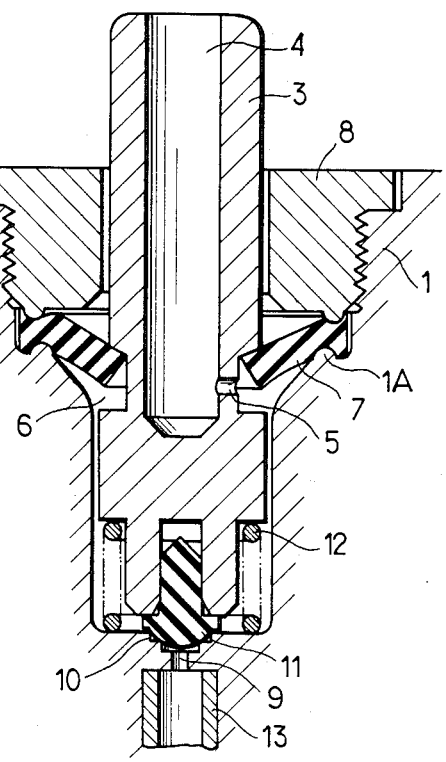

VALVE FOR AEROSOL CONTAINER TO DISPENSE A GIVEN AMOUNT OF AEROSOL

BACKGROUND OF THE INVENTION

1. Field of the invention

The present invention relates to a valve for aerosol container which is capable of dispensing a predetermined amount of aerosol from an associated aerosol tank.

2. Related Art

In a conventional aerosol container when a valve stem is depressed, liquid is forced out in the form of fine mist, and when the valve stem is released to the original stress-free position the liquid spray is made to stop. The ejection of aerosol in the form of a fine mist continues while the valve stem is depressed. A predetermined amount of aerosol, however, cannot be dispensed.

SUMMARY OF THE INVENTION

One object of the present invention is to provide a valve for aerosol container which is capable of dispensing a predetermined amount of aerosol from an associated aerosol tank. To attain this object, an aerosol valve according to the present invention comprises: a base solid having a hole extending straight and diverging upward; a valve stem slidably fitted in the straight section of the hole to define a valve chamber in the hole, said valve stem having a longitudinal channel extending along its central axis, and an outlet communicating the longitudinal channel with the valve chamber, and an annular recess at the level at which the outlet opens, and a valve head fixed to the bottom end of the valve stem; a valve ring fitted in the annular recess, and resting on the annular shoulder formed at the straight-to-divergent transience of the hole; a valve ring pusher fixed to the divergent section of the hole for pushing the valve ring against the annular shoulder in an air-tight fashion; an inlet and inlet seat on the bottom of the hole; and spring means on the bottom of the valve chamber for pushing up the valve stem and keeping the valve head apart from the inlet valve seat.

With this arrangement in the stand-by position, the outlet of the valve stem is shut with the valve ring, and the inlet of the valve chamber is open, thereby permitting the valve chamber to be filled with aerosol. When the valve stem is depressed, the valve ring is yieldingly bent to open the outlet of the valve stem, and at the same time the inlet of the valve chamber is shut with the valve head of the valve stem. Then, a constant amount of aerosol as determined by the space of the valve chamber flows out of the valve chamber to dispense a spray of aerosol from the longitudinal channel of the valve stem while aerosol is prevented to flow in the valve chamber.

Other objects and advantages of the present invention will be better understood from the following description of an aerosol valve according to one embodiment of the present invention, which is shown in the accompanying drawings:

BRIEF DESCRIPTION OF THE DRAWINGS

FIG. 1 is a longitudinal section of the aerosol valve in stand-by position, and

FIG. 2 is a similar view of the aerosol valve with its valve stem depressed for dispensing a spray of aerosol.

PREFERRED EMBODIMENT OF THE INVENTION

Referring to FIGS. 1 and 2, the aerosol valve is shown as having a base solid 1 fixed to the ceiling of an aerosol housing (not shown) in an air-tight fashion. The base solid 1 has a hole extending straight and diverging upward. A valve stem 3 is slidably fitted in the straight section of the hole to define a valve chamber 2 in the straight section of the hole. The valve stem 3 has a longitudinal channel 4 extending along its central axis. The longitudinal channel 4 opens at the upper end of the valve stem, and it reaches short of the lower end of the valve stem. An outlet 5 is made in the valve stem in the vicinity of the lower end of the valve stem to communicate the longitudinal channel 4 with the valve chamber 2. An annular recess 6 is made in the valve stem 3 at the level at which the outlet 5 opens. A valve ring 7 which is made of rubber, is fitted in the annular recess 6 of the valve stem 3. The valve ring 7 shuts the outlet 5 all the time, and it will be yieldingly bent to open the outlet 5 when the valve stem 3 is depressed. The valve ring 7 rests on the annular shoulder 1A formed at the straight-to-divergent transience of the hole, and the valve ring 7 is pushed against the annular shoulder 1A in an air-tight fashion by a valve ring pusher 8, which is fixed to the divergent section of the hole. An inlet 9 is made on the bottom of the valve chamber 2, thereby permitting injection of aerosol from an associated aerosol tank. An inlet valve seat 10 is provided around the inlet 9. A valve head 11 is fixed to the lower end of the valve stem 3. A spring 12 is put in the valve chamber 2 for pushing up the valve stem 3, thereby keeping the valve head 11 apart from the inlet valve seat 10, thus permitting invasion by aerosol in the valve chamber. When the valve stem 3 is depressed, the valve head 11 descends to rest on the inlet valve seat 10, thereby shutting the inlet 9. A dip tube 13 is attached to the inlet 9, extending down to the inside of the aerosol tank. Thus, aerosol is fed to the inside of the valve chamber 2 through the dip tube 13 so that the valve chamber is filled with aerosol. As the outlet 5 is closed with the rubber ring 7, aerosol cannot escape from the valve chamber 2 to the longitudinal channel 4. Thus, as large a quantity of aerosol as the space of the valve chamber is confined and stared in the valve chamber. Although the valve stem 3 is pushed upward by the spring 12, it cannot spring out from the hole; the rubber ring 7 catches the valve stem 3 by the recess 6, thereby preventing the valve stem 3 from jumping out of the hole.

FIG. 2 shows the aerosol valve with its valve stem 3 depressed. As shown, the valve head 11 is put on the inlet valve seat 10 to shut the inlet 9, thereby preventing aerosol from invading the valve chamber 2. On the other hand, the rubber ring 7 is yieldingly bent to open the outlet 5 to the longitudinal channel 4 of the valve stem 3. Thus, a predetermined amount of aerosol as measured by the valve chamber 2 is forced out of the longitudinal channel 4 in as fine mist. Then, no aerosol cannot be fed to the inside of the valve chamber 2, and therefore a fixed amount of aerosol can be dispensed every time the valve stem is depressed.

When the valve stem 3 is released to the original position, the valve stem 3 rises under the influence of the spring 12, and then the rubber ring 7 restore to shut the outlet 5. At the same time the valve head 11 rises apart from the inlet valve seat 10 to open the inlet 9, thereby permitting injection of aerosol in the valve chamber to its full capacity. Thus, the aerosol valve restores to the original stand-by position.

As may be understood from the above, when no force is applied to the valve stem, the valve chamber has a given constant space, and is filled with aerosol. When force is applied to the valve stem to depress it, a spray of aerosol as measured and stored by the valve chamber is dispensed. Thus, no extra amount of aerosol can be forced out.

I claim:

1. A valve mechanism for a pressurized aerosol container to dispense a predetermined amount of aerosol comprising:
   a base solid having a substantially straight hole, said hole having an inlet at the bottom thereof, said inlet being adapted to communicate said hole and said aerosol container and having a multiple-step inlet valve seat;
   a valve stem slidably inserted within said hole, said valve stem being provided with an annular recess around the periphery thereof at substantially a middle section thereof and with a longitudinal channel having a top opening at a top end of said valve stem and a closed end at the position of said annular recess, said channel further having a side outlet at said annular recess to communicate said channel with said hole, said annular recess having a bottom shoulder perpendicular to the axis of said valve stem and a top shoulder inclined against said axis;
   a resilient valve head having a semi-sphere-shape bottom and provided at the bottom of said valve stem in order to open and close said inlet;
   a spring means provided in said hole for urging said valve stem away from said inlet; and
   a valve ring held within said hole, said valve ring having a central bore engaging with said annular recess to close said side outlet, wherein when said valve stem is in a normal position said valve ring sealingly sits on said bottom shoulder of said annular recess in order to seal both said side outlet and bottom shoulder thereby producing a sealed valve chamber below said valve ring within said hole and when said valve stem is pushed toward said inlet until said resilient semi-sphere-shape bottom of said valve head sealingly sits on said multiple-step inlet valve seat, said valve ring is bent downward by said top shoulder of said annular recess in order to open said side outlet.

* * * * *